(12) United States Patent
Thomas et al.

(10) Patent No.: US 11,507,514 B2
(45) Date of Patent: Nov. 22, 2022

(54) SECURE MEMORY TRANSLATIONS

(71) Applicant: Arm Limited, Cambridge (GB)

(72) Inventors: Tessil Thomas, Cambridge (GB);
Jan-Peter Larsson, Cambridge (GB)

(73) Assignee: Arm Limited, Cambridge (GB)

( * ) Notice: Subject to any disclaimer, the term of this patent is extended or adjusted under 35 U.S.C. 154(b) by 147 days.

(21) Appl. No.: 16/782,316

(22) Filed: Feb. 5, 2020

(65) Prior Publication Data
US 2021/0240629 A1  Aug. 5, 2021

(51) Int. Cl.
| | |
|---|---|
| G06F 12/00 | (2006.01) |
| G06F 12/0891 | (2016.01) |
| G06F 12/0873 | (2016.01) |
| G06F 12/0882 | (2016.01) |
| G06F 12/1027 | (2016.01) |
| G06F 12/109 | (2016.01) |
| G06F 12/1081 | (2016.01) |
| G06F 11/30 | (2006.01) |
| G06F 7/58 | (2006.01) |
| H04L 9/06 | (2006.01) |
| H04L 9/08 | (2006.01) |
| G06F 11/07 | (2006.01) |
| H04L 9/32 | (2006.01) |

(52) U.S. Cl.
CPC .......... *G06F 12/0891* (2013.01); *G06F 7/582* (2013.01); *G06F 11/0772* (2013.01); *G06F 11/3027* (2013.01); *G06F 11/3037* (2013.01); *G06F 12/0873* (2013.01); *G06F 12/0882* (2013.01); *G06F 12/109* (2013.01); *G06F 12/1027* (2013.01); *G06F 12/1081* (2013.01); *H04L 9/0643* (2013.01); *H04L 9/0825* (2013.01); *H04L 9/3247* (2013.01)

(58) Field of Classification Search
None
See application file for complete search history.

(56) References Cited

U.S. PATENT DOCUMENTS

| | | | | |
|---|---|---|---|---|
| 2013/0238681 A1* | 9/2013 | Oka | ................... | H03M 7/3062 |
| | | | | 708/250 |
| 2016/0344731 A1* | 11/2016 | Serebrin | ............... | H04L 63/062 |
| 2017/0286421 A1* | 10/2017 | Hayenga | ................ | G06F 9/3842 |

OTHER PUBLICATIONS

R. Avanzi, "The QARMA Block Cipher Family" *IACR Transactions on Symmetric Cryptology*, vol. 2017, No. 1, Mar. 8, 2017, 41 pages.

* cited by examiner

*Primary Examiner* — Daniel D Tsui
(74) *Attorney, Agent, or Firm* — Nixon & Vanderhye P.C.

(57) ABSTRACT

An apparatus is provided, connectable to a memory and one or more peripherals. The apparatus includes translation request circuitry to receive a translation request from one of the peripherals to translate an input address within an input domain to an output address within an output domain. Signing circuitry generates a signature of at least part of the output address using a private key. Translation response circuitry responds to the translation request by transmitting to the one of the peripherals a translation response, including the output address and the signature. Gateway circuitry receives access requests to the memory. Each of the access requests comprises a desired memory address in the output domain and a signature of the desired memory address. The gateway performs validation of the signature of the desired memory address using the private key and in response to the validation of a given access request failing, performs an error action.

15 Claims, 6 Drawing Sheets

| Context | Counter |
|---------|---------|
| 157 | 3 |
| 22 | 0 |
| 2147 | 3163 |
| | |

SECURE MEMORY TRANSLATIONS

TECHNICAL FIELD

The present disclosure relates to data processing. More particularly, it relates to memory translation.

DESCRIPTION

In a data processing apparatus having multiple processing devices, those devices might request translation between input addresses (such as virtual addresses) and output addresses (such as physical addresses of a memory system). The translations can take time to provide, and so it is desirable to store the translations in a cache to reduce future lookup time. In practice, however, this caching can act as a bottleneck to the system. In particular, placing an entry in the cache for one device is liable to remove an entry that is useful to another device. One way to resolve this problem might be to provide each device with its own cache. However, this requires placing trust in the devices that they will not attempt to access areas of memory that have been invalidated or that have been assigned to a different device. In particular, if the caches are held by the devices themselves then there is no centralised translation mechanism that can act as a barrier to prevent a device obtaining the output address of an area of memory that it should not access. It would be desirable to reduce the extent to which the translation mechanism acts as a bottleneck without surrendering the security of the system.

SUMMARY

Viewed from a first example configuration, there is provided an apparatus, connectable to a memory and one or more peripherals, the apparatus comprising: translation request circuitry to receive a translation request from one of the peripherals to translate an input address within an input domain to an output address within an output domain; signing circuitry to generate a signature of at least part of the output address using a private key; translation response circuitry to respond to the translation request by transmitting to the one of the peripherals a translation response, including the output address and the signature; and gateway circuitry to receive access requests to the memory, wherein each of the access requests comprises a desired memory address in the output domain and a signature of the desired memory address, wherein the gateway circuitry is adapted to perform validation of the signature of the desired memory address using the private key and in response to the validation of a given access request failing, to perform an error action.

Viewed from a second example configuration, there is provided a method comprising: receiving a translation request from one of a plurality of peripherals to translate an input address within an input domain to an output address within an output domain; generating a signature of at least part of the output address using a private key; transmitting to the one of the peripherals a translation response, including the output address and the signature; receiving access requests to a memory, wherein each of the access requests comprises a desired memory address in the output domain and a signature of the desired memory address; performing validation of the signature of the desired memory address using the private key; and in response to the validation of a given access request failing, performing an error action.

Viewed from a third example configuration, there is provided an apparatus, connectable to a memory and one or more peripherals, the apparatus comprising: means for receiving a translation request from one of a plurality of peripherals to translate an input address within an input domain to an output address within an output domain; means for generating a signature of at least part of the output address using a private key; means for transmitting to the one of the peripherals a translation response, including the output address and the signature; means for receiving access requests to a memory, wherein each of the access requests comprises a desired memory address in the output domain and a signature of the desired memory address; means for performing validation of the signature of the desired memory address using the private key; and means for performing an error action in response to the validation of a given access request failing.

BRIEF DESCRIPTION OF THE DRAWINGS

The present invention will be described further, by way of example only, with reference to embodiments thereof as illustrated in the accompanying drawings, in which:

FIG. 4 illustrates a series of counters as used in some embodiments;

DESCRIPTION OF EXAMPLE EMBODIMENTS

Figure 1:
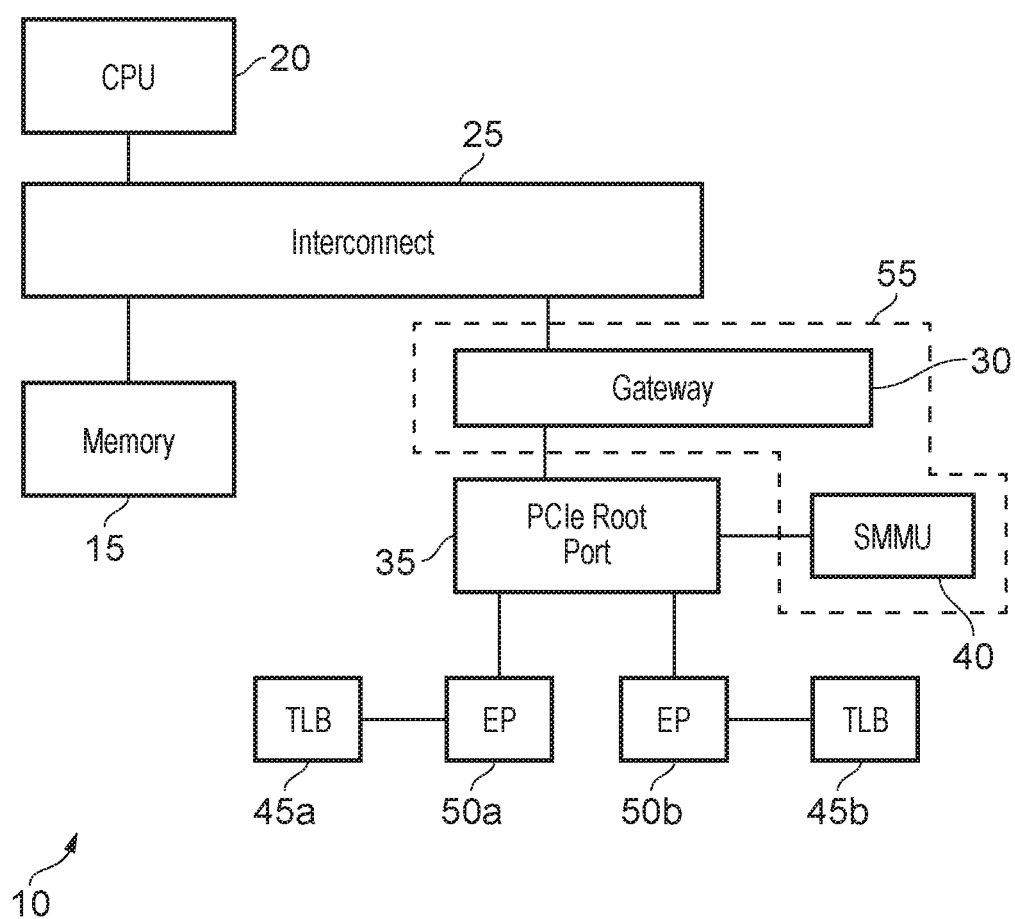
FIG. 1 illustrates a data processing system that contains an apparatus in accordance with some embodiments.

Before discussing the embodiments with reference to the accompanying figures, the following description of embodiments is provided.

In accordance with one example configuration there is provided an apparatus, connectable to a memory and one or more peripherals, the apparatus comprising: translation request circuitry to receive a translation request from one of the peripherals to translate an input address within an input domain to an output address within an output domain; signing circuitry to generate a signature of at least part of the output address using a private key; translation response circuitry to respond to the translation request by transmitting to the one of the peripherals a translation response, including the output address and the signature; and gateway circuitry to receive access requests to the memory, wherein each of the access requests comprises a desired memory address in the output domain and a signature of the desired memory address, wherein the gateway circuitry is adapted to perform validation of the signature of the desired memory address using the private key and in response to the validation of a given access request failing, to perform an error action.

The one or more peripherals issue requests to access a location in the memory. The location can be referenced in one of two ways: an input address (such as a virtual address) or an output address (such as a physical address). The input address is located within an input domain and the output address is located within an output domain. When the input address is provided, an access request can be made in order to check that the peripheral making the request has access to the requested address and that the requested address is valid.

If so, a translation can be performed by the apparatus in order to provide the output address. If not, an error action can be taken such as raising a fault. If and when the output address is generated, a signature corresponding to the output address can be generated along with it. The ability to generate the signature is reserved by the apparatus and therefore it can be assumed that if a valid signature is provided together with an address, then the address has been validly provided by the apparatus. Such reservation is achieved by means of a private key that is used to generate the signature and that is not available to the peripheral. The output address and the corresponding signature are provided back to the requesting peripheral, which can then store the output address together with the signature. In the future, requests from that peripheral can be made using the output address, accompanied by the signature. This time, translation is not required and so the translation process can be omitted. In order to prevent addresses from being invalidly accessed, though, the signature associated with the output address can be checked at a gateway. If the address is found to be invalid (e.g. if the signature does not correspond with the output address) then the request fails and is not forwarded to memory. Otherwise, the request is permitted to proceed. The above system makes it possible for the peripheral to store its own translations. Thus translations generated by another peripheral need not displace those translations generated by other peripherals. At the same time, the peripheral is unable to fake its translations in order to access restricted areas of memory because the peripheral is incapable of generating a valid signature. Furthermore, if the validity of the translation changes then the signature can be invalidated by changing the mechanism used to generate signatures. Thus, an attempt to access the invalidated memory will fail at the gateway.

In some examples, the apparatus comprises: storage circuitry to store a plurality of mappings between input addresses and output addresses, wherein the translation response circuitry is adapted to obtain the output address with reference to the mappings. The storage circuitry could, for instance, take the form of a Translation Lookaside Buffer (TLB). A TLB may be used in order to cache translations between the input address and the output address that have been obtained by other mechanism (for instance by means of a page walk). By storing the translations in such storage circuitry, it is possible to re-provide the translations that have already been obtained. The translation response circuitry can then provide the output address by referring to the storage circuitry to see if the appropriate mapping is available. If the appropriate mapping is available in the storage circuitry, then the output address listed therein can be provided. If not, then the translation is obtained by another mechanism and the obtained translation can then be stored in a storage circuitry for later use.

In some examples, the translation response circuitry is adapted to obtain the output address by issuing a page walk request to the memory. Another manner of obtaining the translation is to perform a page walk. This is a process in which main memory is accessed/queried in order to obtain the page tables. These page tables contain the underlying translations between addresses in the input domain and addresses in the output domain. In practice, a page walk can take a considerable period of time to complete and hence the result of any page walk preferably stored within storage circuitry such as a TLB. This way, it may be possible to avoid repeatedly performing the same time-consuming action.

In some examples, the signature is a cryptographic signature produced using a cryptographic hash function on at least part of the output address and the private key. A cryptographic signature can be produced using a non-trivial hash function. Such a hash function takes, as inputs, at least part of the output address (such as a page number of the physical address) and the private key. The hash function is cryptographic in the sense that it computationally intractable to reverse the hash to obtain the original input. In fact, in practice, the hash that is produced could correspond to a number of different possible inputs, although the likelihood of discovering another input with the same hash (a collision) is improbable. Furthermore, the cryptographic hash function is such that it is computationally intractable deduce the hash for a given input without the private key. Collectively, these properties mean that when presented with an input and its corresponding signature in the form of the part of the cryptographic hash function, it is possible to infer that the generator of the signature was in possession of the private key. In this instance, it is therefore possible to conclude that the input address has been generated by the apparatus, which has access to the private key. Since the hash cannot be reversed, the hash is checked by re-generating the hash from the input (e.g. the physical address) and comparing it to the hash that has been provided. If the two values match, then the hash is correct. As a consequence, if the private key should change at some point, the signature will become invalid. In this way, it is possible to "invalidate" the signature by changing the private key.

In some examples, the cryptographic hash function comprises a truncation operation to truncate the cryptographic signature such that the cryptographic signature and the output address fit within an address field of the access requests. By making use of the existing address field in the access requests, the process of handling the signature can be made invisible to the peripherals. In particular, by providing the physical address and the signature in the address field, this combination of data will be treated as being the physical address by the peripherals and so automatically included when future access requests are made. As a consequence of this, the use of the apparatus is backwards compatible with existing systems, which need not be modified in order to take advantage of the added security.

In some examples, there is a plurality of input domains, including the input domain; and the apparatus comprises storage circuitry to store a plurality of identifiers, each of the identifiers being associated with a different one of the input domains, wherein the private key comprises a plurality of components including one of the identifiers. The input domains could, for instance, correspond with contexts. The peripherals may make use of a number of input (e.g. virtual) domains. These input domains could be shared across a number of peripherals, allocated to single peripheral each, or a set of input domains could be allocated to a single peripheral. Each of the domains could therefore be used in order to provide a different view or all or part of memory. In these examples, the input domains are each given an identifier. The private key then takes, as an input, one of the identifiers. All of the translations associated with a single specific input domain can thus be invalidated. In particular, by changing the identifier associated with that input domain, the input to the private key (and thus the private key itself) is changed. As a consequence, the signature for a given input address is changed and so when this is compared to the previously generated hash, there will not be a match—thereby invalidating the signature. This makes it possible to increase the selectivity with which invalidation occurs. That is, rather than invalidating all input addresses, it is possible to invalidate a set of input addresses—those belonging to a particular input domain. Since the invalidation of translations means that future requests for the invalidated addresses may have to be performed using another means, such as a page walk, which is time consuming, it is desirable to carefully control the invalidation of translations.

In some examples, the apparatus comprises invalidation circuitry adapted, in response to receiving an invalidation, request to change the private key. Invalidation requests may originate from a Central Processing Unit (CPU), for instance. Such invalidation may occur as a consequence of memory being freed (e.g. when a process ends) or as a consequence of ownership of that area of memory changing. When such an invalidation request is received, it is important for devices within the system to no longer access that area of memory. This is because the memory could now be allocated to a different device, with different permissions. As explained above, by changing the private key it is possible to render translations unusable. In this way, it is possible to reduce the risk of using translations that refer to areas of memory that have been invalidated. In general, in response to receiving an invalidation request, the apparatus will also forward the invalidation request to devices where the translations are stored so that those translations themselves are also invalidated. A correctly configured device should not use a translation that has been marked as being invalid, and the inability to provide a signature that is still valid (due to the private key being changed) prevents such access.

In some examples, there are a plurality of input domains, including the input domain; and the apparatus comprises storage circuitry to store a plurality of identifiers, each of the identifiers being associated with a different one of the input domains, wherein the private key takes a plurality of components, including one of the identifiers, as inputs; and when the invalidation request is in respect of a given one of the input domains, the invalidation circuitry is adapted to determine an identifier in the identifiers that is associated with the given one of the input domains, and to change the identifier. An invalidation request can be sent in respect of a particular input domain. In these situations, an identifier that is associated with that input domain is changed. Consequently, translations that have been generated in respect of that input domain are no longer valid and so attempts to use the corresponding output address with the generated signature will fail due to the signature no longer matching. This makes it possible to be selective in respect of invalidations that occur. In particular, rather than invalidating all translations within the system, invalidation can be restricted to translations that are provided in respect of a particular input domain (e.g. context).

In some examples, the identifiers are counters; and the identifier is changed by incrementing the identifier. By using counters as the identifiers, it becomes straightforward to change an identifier in response to an invalidation request being received. In particular, this can be achieved merely by incremented the associated counter/identifier. Where the identifier is used as an input of a cryptographic hash function, the fact that the identifier is only changed by a small amount does not lessen the security of the system since a cryptographic hash function will generally cause the output of a hash operation to change significantly and unpredictably in response to even a minor change to the inputs.

In some examples, the private key takes an at least pseudo-random number as an input; and when the invalidation request is not in respect of a given one of the input domains, the invalidation circuitry is adapted to change the at least pseudo-random number. Although invalidation requests can be made in respect of a particular input domain (e.g. context), it is also possible for the invalidation circuitry to invalidate all translations by changing an at least pseudo random number, which is used as a further input to the private key for each of the input domains. This number is at least pseudo random in the sense that it could be a truly random number. However, as the skilled person will appreciate, data processing systems typically have difficulty in generating truly random numbers. In particular, a number of techniques exist for generating numbers that appear to be random, but which may actually have some element of predictability. Such techniques may be considered to be pseudo-random.

In some examples, the error action comprises generating a fault. A fault is a process in which the CPU can be notified of a situation that is unexpected. This can result in a particular software routine being invoked in the hope that the situation can be recovered. Consequently, by generating a fault, the software can determine the most appropriate course of action.

In some examples, the fault is a memory fault. A memory fault can be generated where memory is accessed inappropriately (e.g. where the accessor or the memory does not have permission to access that particular area of memory).

In some examples, the error action comprises inhibiting future access requests that originate from an origin peripheral of the given access request. When areas of memory become invalid, devices that could have the corresponding address stored are informed of the invalidation—thereby giving them the chance to invalidate any corresponding stored entries that they have for the address. Consequently, if a device makes an attempt to access an invalidated area of memory, it could be concluded that the device is either badly configured or is behaving maliciously (e.g. to access memory that it has no right to access). In these embodiments, therefore, the error correction involves blocking the peripheral so that future requests are disregarded or ignored. This improves the security of the system by making it difficult for such a device to continue operating.

In some examples, the input address is a virtual address; and the output address is a physical address of the memory. Note that the input address space and the output address space may be of different sizes. In particular, the input address space may be significantly larger than the output address space. Where the output address space is a physical address space, the address space is limited by the amount of memory that is present.

In some examples, the peripherals are PCI or PCIe peripherals.

In some examples, the output address is a physical address of the memory; and the at least part of the output address is a page number of the memory. By using a page number of the output address, which therefore excludes the page offset, requests for translations of addresses that are on the same page in memory can be serviced more quickly. In particular, obtaining a translation for a particular address means that it is not necessary to re-translate an address that targets another part of the same page in memory. Instead, the same physical page number can be used and the old page offset can be replaced with the new page offset. In the present embodiments, if the signature is based on the page number (rather than the offset) the same signature can be used. Since memory can be allocated on a page basis, this should not result in any reduction in security. If the peripheral is permitted to access one address on a memory page then it is permitted to access another address on the same memory page.

Particular embodiments will now be described with reference to the figures.

FIG. 1 illustrates a data processing system 10 that contains an apparatus 55 in accordance with some embodiments. The data processing system 10 includes a Central Processing Unit (CPU) 20 that executes software instructions. The CPU 20 is connected via an interconnect 25 to a main memory 15, which may be backed by DRAM. The interconnect 25 also provides access to a PCIe root port 35. The root port 35 acts as a root to a number of end points 50a, 50b, which make take the form of peripherals. These peripherals 50a, 50b interact with the system 10 using either PCI or PCIe. Each of the end points 50a, 50b has its own corresponding Translation Lookaside Buffer (TLB) 45a, 45b. The TLBs 45a, 45b provide translations between virtual addresses (which are an example of input addresses) and physical addresses (which are an example of output addresses) that are used by the memory 15. The translations are provided to the end points 50a, 50b for storing in their TLBs 45a, 45b by a System Memory Management Unit (SMMU) 40 after checking access permissions of the end point 50a, 50b that is requesting the translation.

In the present embodiment, the SMMU 40 also provides a signature together with each translation that is provided. These are both stored in the TLBs 45a, 45b and thereafter, when the end point 50a, 50b requires the address, this can be looked up from the end point's TLB 45a, 45b together with the corresponding signature. Access requests that are made by the end points 50a, 50b include both the physical address and the corresponding signature. The gateway circuitry 30 provides connectivity between the endpoints 50a, 50b and the memory 15. For each access request that is made, the gateway circuitry 30 checks that the signature is correct. If the signature does not match what is expected, then an error action is taken by the gateway 30. Otherwise, the access request is permitted to proceed to the memory 15 where the access request is serviced. Each of the gateway circuitry 30 and the SMMU 40 use a private key in order to check and generate the signature respectively.

In this way, each end point 50a, 50b is able to store translations that it obtains in its associated TLB 45a, 45b. Consequently, the use of a TLB 45a by one end point 50a does not impact the use of another TLB 45b by another end point 50b. Phrased differently, the translations obtained by one end point 50a do not overwrite translations obtained by another end point 50b in either of the TLBs 45a, 45b. Despite the fact that each end point 50a, 50b is responsible for keeping its own translations, security is maintained through the use of a signature which makes it possible to validate one or more translations in such a way that can be easily detected by the gateway circuitry 30. This makes it difficult if not impossible for an end point 50a, 50b to access a memory location for which no translation was provided, or for an end point 50a, 50b to continue to access memory location that has been invalidated.

Figure 2:
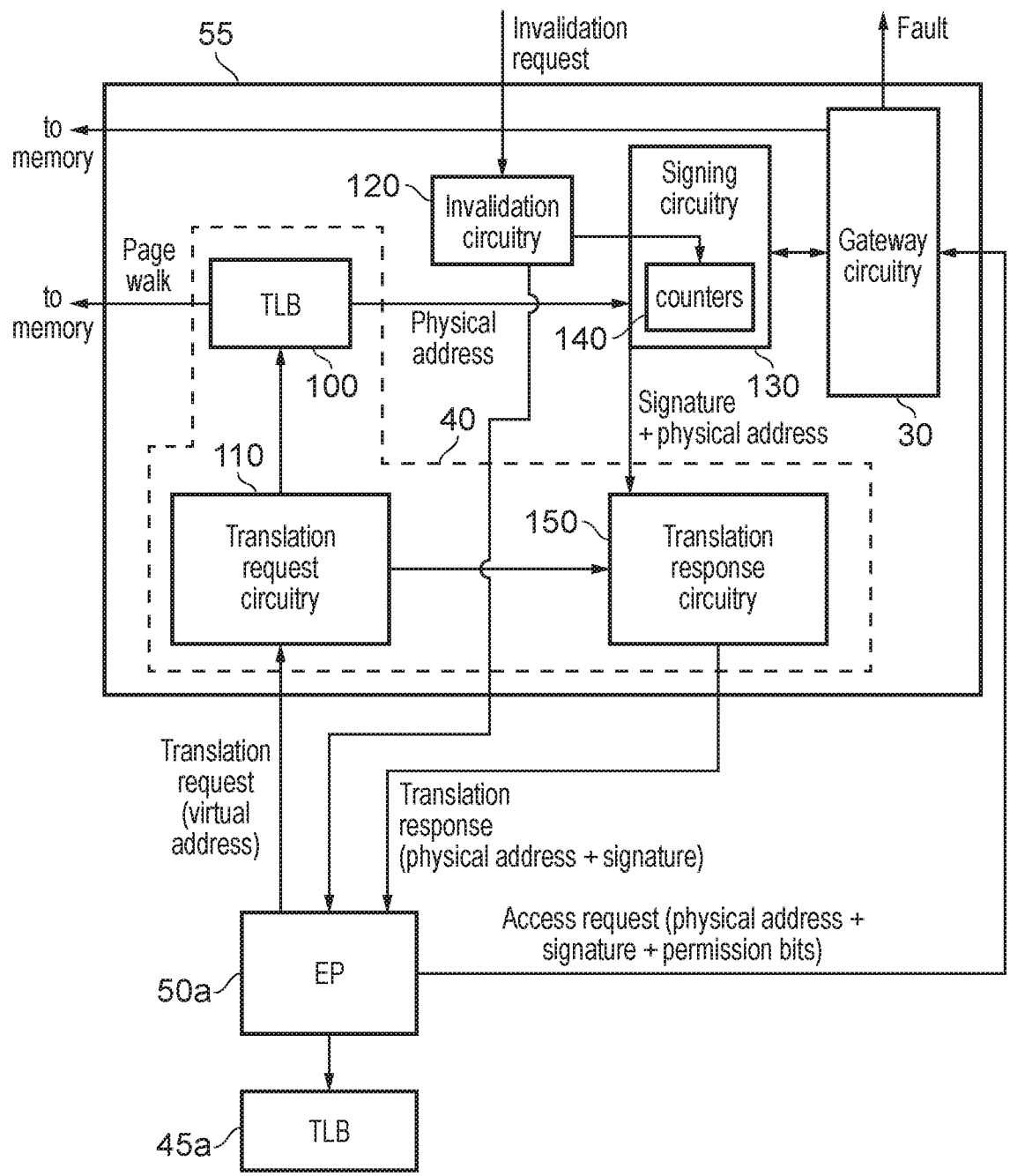
FIG. 2 illustrates an apparatus in accordance with some embodiments.

FIG. 2 illustrates the apparatus 55 in more detail. Translation request circuitry 110 receives translation requests from an end point 50a. The translation request circuitry 110 attempts to obtain the translation from a local TLB 100. If the translation is not available in the local TLB 100, then a page walk can be performed. In practice, a page walk can take a significant period of time and hence the local TLB 100 may be provided in order to limit the occasions when a page walk is necessitated. In either event, having obtained the translation, access permissions are checked. In particular, it is checked whether the end point 50a is permitted to access the physical memory location. If not, then a memory fault can be raised. Otherwise, the translation is provided to signing circuitry 130. The signing circuitry 130 uses a cryptographic hash in order to generate a signature based on at least part of the physical address. In practice, the signature can be generated using the entirety of the physical address, or could be generated using part of the physical address such as a memory page number. In these embodiments, the signature is based on the page number that makes up part of the physical address. In other embodiments, the hash could be carried out on all of the address except for the page offset. In any event, the signature and physical address are passed to translation response circuitry 150, which responds to the translation request with the requested physical address and the generated signature. If the translation was obtained as a result of a page walk, the translation can also be stored in the local TLB 100.

Having received the physical address and signature, the end point 50a can then store the translation in its TLB 45a. In the future, when the end point 50a wishes to access the physical address, an access request is made by the end point 50a. The access request includes both the physical address and the corresponding signature that was generated by the signing circuitry 130. The gateway circuitry 30 receives the access request containing the physical address and the signature, it generates its own copy of the signature (a check signature) of the provided physical address and checks this against the signature provided by the end point 50a. If there is a match then the request is considered to be legitimate, and is passed to main memory 15. Otherwise, the gateway circuitry 30 causes an error action to be taken such as the generation of a (memory) fault.

The signing circuitry 130 generates the signature by means of a private key. The same key is used by the gateway circuitry to generate the check signature that is compared to the signature that is provided as part of the access request. Consequently, if the private key is changed between the original generation of the signature, which is provided with the physical address that is passed to the end point 50a by the translation response circuitry 150, and the signature being checked by the gateway circuitry 30, then the signature will not match and so the fault will be generated.

In some embodiments, a set of counters 140 are used to form the private key. The counters can be used to selectively invalidate some of the translations that have been provided, as will be explained below.

When an invalidation request is received, this is processed by invalidation circuitry 120. The invalidation circuitry 120 changes all or part of the private key. Consequently, the signature associated with certain physical addresses will change and so at least some of the translations that have been previously issued will no longer be valid. The invalidation circuitry 120 is also responsible for passing the invalidation request on to the end points 50a, so that the appropriate entries of the end points TLB 45a can also be invalidated.

Note that the above explanation assumes that a translation request and an access request are separate requests. In practice, this need not be so. In particular, in some embodiments, a field of the access request (e.g. a bit) marks whether a translation is required or not. If a translation is required then the translation is obtained and returned to the end point 50a as explained above but additionally, the access request proceeds using the translated address. If no translation is required, then the access request simply proceeds as explained above.

Similarly, in these examples, the gateway circuitry 30 and signing circuitry 130 are illustrated separately. However, these could form part of the same circuitry.

Figure 3:
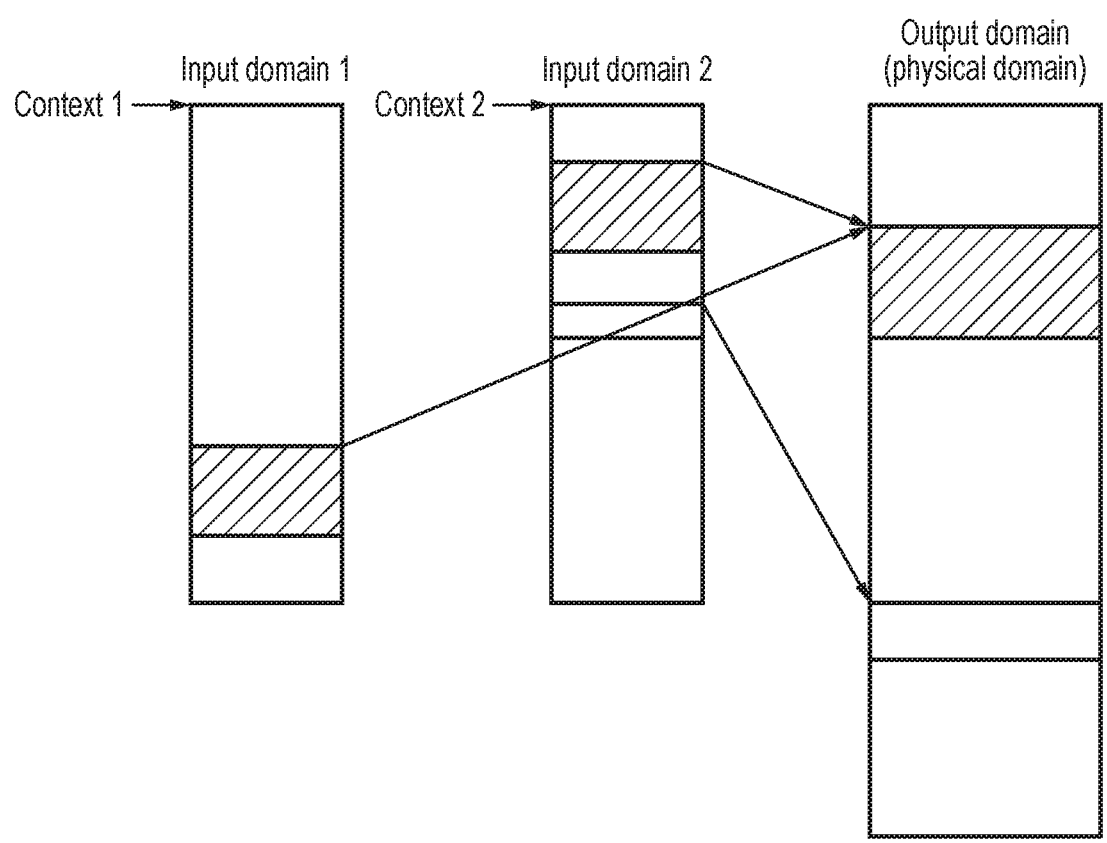
FIG. 3 illustrates the use of multiple input domains for the virtual addresses used by end points, in accordance with some embodiments.

FIG. 3 illustrates the use of multiple input domains for the virtual addresses used by end points 50a, 50b. In particular, FIG. 3 illustrates a first input domain and a second input domain. These two domains could be separated such that one domain is used by a first end point 50a and the second domain is used by a second end point 50b. Alternatively, both domains could be used by a single end point 50a, or both domains could be used by both end points 50a, 50b. Each of the domains provides a view of a virtual memory space. It may be the case that the size of the virtual memory space differs from the size of the physical memory space. The term "context" is used to refer to a location in memory where the tables that provide the mappings between the input domains and the output domains are located.

Figure 4:
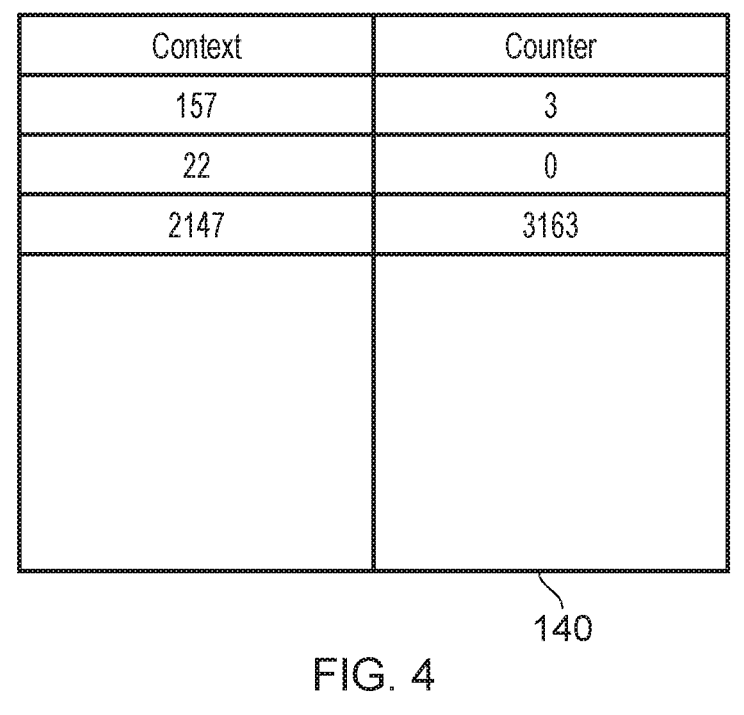

FIG. 4 illustrates a series of counters 140, each of which is associated with a particular context. These counters are identifiers that are provided as inputs to the private key that is used for the generation of signatures. In this example, each context has its own identifier (counter). By changing one of the identifiers, the private key used for signing in respect of the associated context will change. Consequently, the signature used for signing in respect of that associated context will also change. For example, a signature S will be produced for signing a physical address A associated with context '157'. The private key used for such signing will take the associated identifier '3' as an input. Similarly a signature T will be produced for signing a physical address B associated with context '22'. In particular, the private key used for this signing will take the associated identifier '0' as an input. If the identifier for context '22' is changed from '0' to '1' then the signature used for signing physical address A (associated with context '157') will remain as the signature S. However, the signature T' will be produced for signing the physical address B associates with context '22', since such signing will now take the associated identifier '1' as an input. This makes it possible to invalidate translations associated with one context without affecting translations associated with other contexts.

Figure 5:
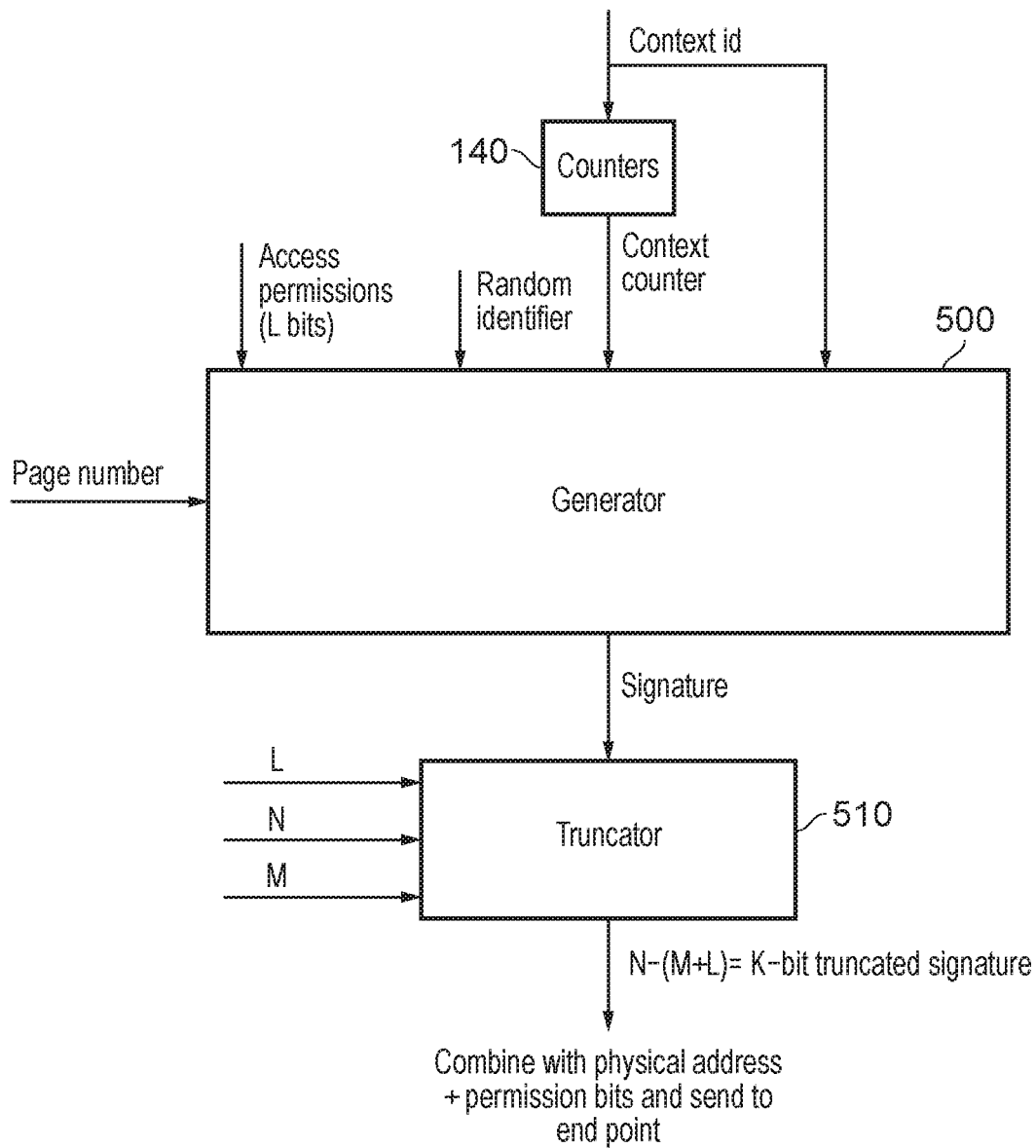
FIG. 5 illustrates a way in which signing can occur in accordance with some embodiments.

FIG. 5 illustrates the way in which signing occurs. A generator 500 takes as an input a page number of a physical address that is to be signed. In other embodiments, the entirety of the physical address may be used or a different part of the physical address may be used. In addition, the generator takes as inputs L bits that represent access permissions of the physical address, a random identifier, the context-specific counter or identifier (discussed in relation to FIG. 4), and an identifier of the context which the translation is desired. Each of these inputs is then used to generate a signature using a cryptographic hashing function. There are a number of choices for cryptographic hash function. However, in some embodiments, the QARMA algorithm (described in Avanzi, R. (2017). The QARMA Block Cipher Family. Almost MDS Matrices Over Rings With Zero Divisors, Nearly Symmetric Even-Mansour Constructions With Non-Involutory Central Rounds, and Search Heuristics for Low-Latency S-Boxes. IACR Transactions on Symmetric Cryptology, 2017(1), 4-44) is used. The output of the generator 500 is a signature. As previously described, the signature is such that it corresponds with the access permissions, random identifier, context counter, counter identifier, and page number. If any one of these changes, even slightly, then a different signature is produced. The signature is provided to a truncator 510, which receives a number of values as inputs. In particular, the truncator 510 considers the number of bits used by the access permissions (L), the number of bits required to represent a physical address in the system (M), and the word size in bits of the system (N). The signature is then truncated to N−(M+L) bits. For instance, if there are 2 bits used by the access permissions, the number of bits required to represent a physical address is 48, and the word size of the system is 64 bits then the signature is truncated to 64−(48+2)=14 bits.

Typically, the field used to provide a physical address has a capacity equal to the word length of the system. This is because, theoretically, the number of bits required to represent the physical address could be equal to the word length of the system. In practice, however, most systems use significantly fewer bits. By truncating the signature rather than using the entirety of the signature, the combination of the truncated signature, physical address, and permission bits can be fit into a field that is provided for the physical address. By making use of the entirety of this field, security can be added without necessitating a change in the format of the data packets that are used to transmit memory access requests. The use of the cryptographic signature may therefore be made invisible to the end points 50a, 50b. This provides backwards compatibility with existing systems.

Figure 6:
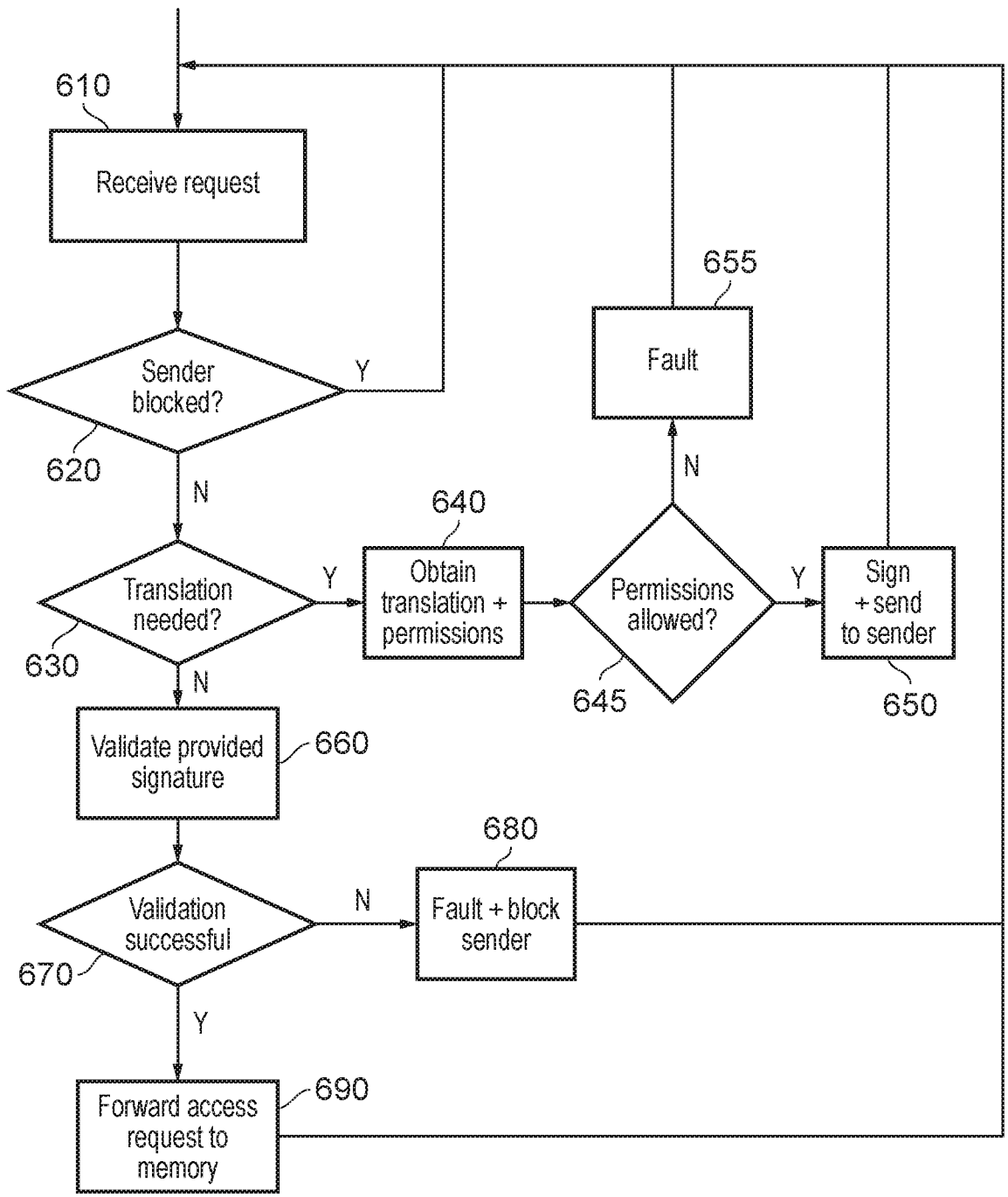
FIG. 6 shows a flow chart that shows an example of data processing in accordance with some examples.

FIG. 6 illustrates a flow chart 600 that shows an example of data processing in accordance with some examples. The process begins at a step 610 where the apparatus 55 receives a request. At 620, it is determined whether a sender (end point) 50a, 50b of the request has been blocked by the system—i.e. whether the sender is being ignored. If so, then the process simply returns to step 610 without any further action being taken. In consequence of this, the sender is effectively ignored. If the sender is not blocked, then at step 630, it is determined whether an address translation is needed (e.g. if the end point 50a, 50b has provided a virtual address). As previously explained, this can be achieved by a special bit in the request being set to indicate whether a translation is needed or not. If a translation is needed, then at step 640, the apparatus 55 obtains a translation of the provided address and any associated access permissions. This can be achieved using the TLB 100, which forms part of the apparatus 55, and/or a page walk. At a step 645, the associated permissions are checked against the sender to see if the sender is permitted to access the requested memory. If not, then at step 655, a fault is raised. The process then returns to step 610 with the request unfulfilled. Otherwise, the process proceeds to step 650. Here, the translation is signed, as illustrated with respect to FIG. 5 for instance. The translation, signature, and any permission bits associated with the physical address are provided back to the sender. When this information is received by the end point, it is stored in the TLB 45a of the end point 50a that is the sender. Note that if the request was an access request that necessitated translation, then the access request is also forwarded to memory. In either event, the process returns to step 610. If a translation is not needed (e.g. if the request includes a physical address and a signature), then at step 660, the signature is compared to the provided physical address. In this example, such checking is performed by the gateway circuitry 30 that receives the request. The checking is performed by regenerating the signature for the provided physical address using the current private key in the same manner as is carried out for the signing process (including truncation if necessary). The result is compared to the provided signature in the access request. At step 670, it is determined whether there is a match. If so, then at step 690, the access request is sent to the memory 15 in order to access the physical address that has been provided. The process then returns to step 610. Otherwise, at step 680, a fault is raised and the sender is blocked. The process then returns to step 610.

Accordingly, it has been described how each end point 50*a*, 50*b* can utilise its own TLB 45*a*, 45*b*. Since each end point 50*a*, 50*b* is aware of its own usage pattern, the end points 50*a*, 50*b* can manage their own TLBs 45*a*, 45*b*, which can enable each end point to optimise its own TLB 45*a*, 45*b* usage. Since the TLBs 45*a*, 45*b* are separated, there is little or no interference between these TLBs 45*a*, 45*b*. In particular, the translations obtained by one end point 50*b* do not overwrite the translations provided by a different end point 50*a*. Security problems are reduced by signing the physical addresses, which are checked by the gateway circuitry 30. In this way, it is possible to check that previously provided translations are (still) valid. Thus, if a particular end point 50*a* was to ignore invalidation requests (either maliciously or as a consequence of poor configuration), accesses to invalid sections of the memory 15 by that end point 50*a* can be blocked. The security of the system is therefore maintained while enabling improved efficiency.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus, connectable to a memory and one or more peripherals, the apparatus comprising:
   translation request circuitry to receive a translation request from one of the peripherals to translate an input address within an input address domain to an output address within an output address domain;
   signing circuitry to generate a signature of at least part of the output address using a private key;
   translation response circuitry to respond to the translation request by transmitting to the one of the peripherals a translation response, including the output address and the signature; and
   gateway circuitry to receive access requests to the memory, wherein each of the access requests comprises a desired memory address in the output address domain and a signature of the desired memory address, wherein the gateway circuitry is adapted to perform validation of the signature of the desired memory address using the private key and in response to the validation of a given access request failing, to perform an error action;
   invalidation circuitry adapted, in response to receiving an invalidation request, to change the private key, wherein there are a plurality of input address domains, including the input address domain; and
   the apparatus comprises storage circuitry to store a plurality of counters, each of the counters being associated with a different one of the input address domains, wherein
   the private key takes a plurality of components, including one of the counters, as inputs; and
   when the invalidation request is in respect of a given one of the input address domains, the invalidation circuitry is adapted to determine a counter in the counters that is associated with the given one of the input address domains, and to change the counter.

2. The apparatus according to claim 1, comprising:
   storage circuitry to store a plurality of mappings between input addresses and output addresses, wherein
   the translation response circuitry is adapted to obtain the output address with reference to the mappings.

3. The apparatus according to claim 1, wherein
   the translation response circuitry is adapted to obtain the output address by issuing a page walk request to the memory.

4. The apparatus according to claim 1, wherein
   the signature is a cryptographic signature produced using a cryptographic hash function on the at least part of the output address and the private key.

5. The apparatus according to claim 4, wherein
   the cryptographic hash function comprises a truncation operation to truncate the cryptographic signature such that the cryptographic signature and the output address fit within an address field of the access requests.

6. The apparatus according to claim 1, wherein
   the private key comprises a plurality of components including one of the counters.

7. The apparatus according to claim 1, wherein
   the private key takes an at least pseudo-random number as an input; and
   when the invalidation request is not in respect of a given one of the input address domains, the invalidation circuitry is adapted to change the at least pseudo-random number.

8. The apparatus according to claim 1, wherein
   the error action comprises generating a fault.

9. The apparatus according to claim 8, wherein
   the fault is a memory fault.

10. The apparatus according to claim 1, wherein
    the error action comprises inhibiting future access requests that originate from an origin peripheral of the given access request.

11. The apparatus according to claim 1, wherein
    the input address is a virtual address; and
    the output address is a physical address of the memory.

12. The apparatus according to claim 1, wherein
    the peripherals are PCI or PCIe peripherals.

13. The apparatus according to claim 1, wherein
    the output address is a physical address of the memory; and
    the at least part of the output address is a page number of the memory.

14. A method comprising:
    receiving a translation request from one of a plurality of peripherals to translate an input address within an input address domain to an output address within an output address domain;
    generating a signature of at least part of the output address using a private key;

transmitting to the one of the peripherals a translation response, including the output address and the signature;

receiving access requests to a memory, wherein each of the access requests comprises a desired memory address in the output address domain and a signature of the desired memory address;

performing validation of the signature of the desired memory address using the private key; and in response to the validation of a given access request failing, performing an error action, in response to receiving an invalidation request, changing the private key, wherein there are a plurality of input address domains, including the input address domain; and the method comprises storing a plurality of counters, each of the counters being associated with a different one of the input domains, wherein the private key takes a plurality of components, including one of the counters, as inputs; and the method comprises determining that the invalidation request is in respect of a given one of the input address domains, and then determining a counter in the counters that is associated with the given one of the input address domains and changing the counter.

15. An apparatus, connectable to a memory and one or more peripherals, the apparatus comprising:

means for receiving a translation request from one of a plurality of peripherals to translate an input address within an input address domain to an output address within an output address domain;

means for generating a signature of at least part of the output address using a private key;

means for transmitting to the one of the peripherals a translation response, including the output address and the signature;

means for receiving access requests to a memory, wherein each of the access requests comprises a desired memory address in the output address domain and a signature of the desired memory address;

means for performing validation of the signature of the desired memory address using the private key; and means for performing an error action in response to the validation of a given access request failing;

means for changing the private key in response to receiving an invalidation request, wherein there are a plurality of input address domains, including the input address domain; and the apparatus comprises means for storing a plurality of counters, each of the counters being associated with a different one of the input address domains;

the private key takes a plurality of components, including one of the counters, as inputs; and when the invalidation request is in respect of a given one of the input address domains, the means for changing the private key is adapted to determine a counter in the counters that is associated with the given one of the input address domains, and to change the counter.

* * * * *